(12) United States Patent
Beckman et al.

(10) Patent No.: US 7,347,263 B2
(45) Date of Patent: Mar. 25, 2008

(54) NETWORKED POLYMERIC GELS AND USE OF SUCH POLYMERIC GELS IN HYDROCARBON RECOVERY

(75) Inventors: Eric J. Beckman, Aspinwall, PA (US); Ronald A. LoSasso, Vonore, TN (US); Janice E. LoSasso, Vonore, TN (US)

(73) Assignee: University of Pittsburgh - of the Commonwealth of Higher Education, Pittsburgh, PA (US)

( * ) Notice: Subject to any disclaimer, the term of this patent is extended or adjusted under 35 U.S.C. 154(b) by 218 days.

(21) Appl. No.: 11/065,806

(22) Filed: Feb. 25, 2005

(65) Prior Publication Data

US 2005/0194145 A1 Sep. 8, 2005

Related U.S. Application Data

(60) Provisional application No. 60/548,300, filed on Feb. 27, 2004.

(51) Int. Cl.
 *E21B 43/20* (2006.01)
 *E21B 43/22* (2006.01)
 *E21B 33/138* (2006.01)

(52) U.S. Cl. ............ 166/270; 166/275; 166/294; 166/295; 166/300; 166/305.1; 507/209; 507/211; 507/222; 507/225; 507/230; 507/903

(58) Field of Classification Search ............ 507/209, 507/222, 210, 211, 223, 225, 229, 230, 903; 166/270, 275, 288, 294, 295, 300, 305.1
See application file for complete search history.

(56) References Cited

U.S. PATENT DOCUMENTS

| 3,058,873 A | 10/1962 | Keim |
| 3,580,879 A * | 5/1971 | Einosuke et al. ............ 524/809 |
| 3,728,214 A | 4/1973 | Espy |
| 3,744,566 A * | 7/1973 | Szabo et al. ................. 166/275 |
| 3,748,221 A | 7/1973 | Stockmann |

(Continued)

FOREIGN PATENT DOCUMENTS

| EP | 0331047 A1 | 9/1989 |
| EP | 0 5096 192 B1 | 5/1995 |
| EP | 0 539 289 B1 | 1/1996 |
| EP | 0 604 988 | 9/1999 |
| EP | 0 896 122 A2 | 10/1999 |

(Continued)

OTHER PUBLICATIONS

Kofflin, S.A., et al., "Formation of Hydrogels Using Poly(vinylalcohol)/Poly(vinylamine) Copolymers and D-Glucose," Slides from oral presentation at REU Summer Research Symposium, Aug. 7, 2001.

(Continued)

*Primary Examiner*—George Suchfield
(74) *Attorney, Agent, or Firm*—Bartony & Hare, LLP

(57) ABSTRACT

A composition includes water having a salinity of at least 1 ppt, at least one hydrophilic polymer containing primary (—NH$_2$) and/or secondary (—NHR) amine groups and at least one saccharide containing a reducible function. A method of changing the permeability of a subterranean formation includes the step of injecting into a subterranean formation a composition comprising water, at least one hydrophilic polymer containing at least two groups which are independently the same or different a primary amine group or a secondary amine group and at least one saccharide containing a reducible function.

27 Claims, 4 Drawing Sheets

U.S. PATENT DOCUMENTS

| | | | |
|---|---|---|---|
| 3,945,929 A * | 3/1976 | Martin | 507/225 |
| 4,039,028 A * | 8/1977 | Knight | 166/246 |
| 4,100,079 A * | 7/1978 | Sinkovitz et al. | 507/222 |
| 4,152,199 A | 5/1979 | Hamerstrand | |
| 4,421,602 A | 12/1983 | Brunnmueller | |
| 4,450,198 A | 5/1984 | Michaels | |
| 4,461,351 A | 7/1984 | Falk | |
| 4,524,829 A | 6/1985 | Hanlon | |
| 4,561,502 A | 12/1985 | Norton | |
| 4,601,340 A | 7/1986 | Fodor | |
| 4,636,572 A | 1/1987 | Hudson | |
| 4,657,944 A | 4/1987 | Bruning | |
| 4,690,219 A * | 9/1987 | Burns et al. | 166/307 |
| 4,706,754 A | 11/1987 | Smith | |
| 4,716,966 A * | 1/1988 | Shu | 166/295 |
| 4,744,418 A | 5/1988 | Sydansk | |
| 4,774,285 A | 9/1988 | Pfohl | |
| 4,782,900 A | 11/1988 | Fung | |
| 4,788,280 A | 11/1988 | Billmers | |
| 4,818,341 A | 4/1989 | Degen | |
| 4,830,108 A | 5/1989 | Hazlett | |
| 4,834,182 A * | 5/1989 | Shu | 166/295 |
| 4,940,514 A | 7/1990 | Stange | |
| 4,950,514 A | 8/1990 | Strassheimer | |
| 5,125,456 A | 6/1992 | Hutchins | |
| 5,262,008 A | 11/1993 | Moench | |
| 5,281,307 A | 1/1994 | Smigo | |
| 5,380,403 A | 1/1995 | Robeson | |
| 5,397,436 A | 3/1995 | Robeson | |
| 5,708,107 A | 1/1998 | Ahmed | |
| 5,735,349 A * | 4/1998 | Dawson et al. | 166/295 |
| 5,789,351 A * | 8/1998 | Ahmed et al. | 507/203 |
| 5,846,788 A | 12/1998 | Pedersen | |
| 5,849,674 A | 12/1998 | Fox | |
| 5,851,300 A | 12/1998 | Linhart | |
| 5,905,100 A | 5/1999 | Moradi-Araghi | |
| 6,124,245 A * | 9/2000 | Patel | 507/120 |
| 6,127,319 A * | 10/2000 | House | 507/110 |
| 6,146,497 A | 11/2000 | Nguyn | |
| 6,165,322 A | 12/2000 | Bower | |
| 6,179,962 B1 | 1/2001 | Brady | |
| 6,211,296 B1 | 4/2001 | Frate | |
| 6,364,016 B1 | 4/2002 | Dalrymple | |
| 6,465,397 B1 * | 10/2002 | Patterson | 507/222 |
| 6,616,807 B1 | 9/2003 | Dyllick-Brenzinger | |
| 6,710,175 B2 | 3/2004 | Anderson | |
| 6,803,348 B2 * | 10/2004 | Jones et al. | 507/221 |
| 6,981,552 B2 * | 1/2006 | Reddy et al. | 166/294 |
| 7,004,253 B2 * | 2/2006 | Chiappa et al. | 166/263 |
| 7,090,745 B2 | 8/2006 | Beckman | |
| 7,135,598 B2 | 11/2006 | Beckman | |
| 2003/0192664 A1 | 10/2003 | Kulick | |
| 2004/0050513 A1 | 3/2004 | Beckman | |
| 2005/0082025 A1 | 4/2005 | Carroll | |

FOREIGN PATENT DOCUMENTS

| | | |
|---|---|---|
| GB | 1 259 533 A | 1/1972 |
| WO | WO 95/18908 | 7/1995 |
| WO | WO 95/18909 | 7/1995 |
| WO | WO 95/18910 | 7/1995 |
| WO | WO 96-17154 | 6/1996 |
| WO | WO 98/45536 | 10/1998 |
| WO | WO 00/36269 | 6/2000 |
| WO | WO 01/29313 A1 | 4/2001 |
| WO | WO 2004/025027 | 3/2004 |
| WO | WO 2005/085361 | 9/2005 |

OTHER PUBLICATIONS

Kofflin, S.A, et al., "Formation of Hydrogels Using Poly(vinylalcohol)/Poly(vinylamine) Copolymers and D-Glucose," Slides from poster presentation at REU Summer Research Symposium, Aug. 7, 2001.

Kofflin, S.A., "Formation of Hydrogels Using Poly(vinylalcohol)/Poly(vinylamine) Copolymers and D-Glucose," Slides from oral presentation at Saint Mary's College Student Paper Day Presentation, Apr. 23, 2002.

Kofflin, S.A., "Formation of Hydrogels Using Poly(vinylalcohol)/Poly(vinylamine) Copolymers and D-Glucose," Slides from oral presentation at Saint Mary's Senior Comprehensive, Apr. 11, 2002.

Yamaura, Kazuo. et al., Effect of Addition of Saccharides on Gelatin of Aqueous Poly(vinyl alcohol) Solutions; J. of Applied Polymer Science. 1999, 74, 1298-1303.

Nestor, S., "Summer Internship Leads to Patent for St. Mary's Senior," Observer Online, Sep. 11, 2001.

Yamaura, Kazuo. et al., Gelation of POly(vinyl Alcohol) Solutions of Low Temperatures (20 to −78 degred Celsius) and Properties of Gels; S. J. of Applied Polymer Science; 1994, 51, 2041-2046.

* cited by examiner

NETWORKED POLYMERIC GELS AND USE OF SUCH POLYMERIC GELS IN HYDROCARBON RECOVERY

CROSS-REFERENCE TO RELATED APPLICATION

The present application claims the benefit of U.S. Provisional Patent Application Ser. No. 60/548,300, filed Feb. 27, 2004, the disclosures of which are incorporated herein by reference.

BACKGROUND OF THE INVENTION

The present invention relates to crosslinked or networked polymeric gels and to methods of hydrocarbon production or recovery from underground formations using such networked polymeric gels, and, especially, to networked polymeric gels that are suitable to withstand high temperatures and/or high salt content/salinity (for example, commonly experienced in hydrocarbon/oil production and recovery) and to methods of using such gels in hydrocarbon/oil production or recovery.

Gelled or crosslinked water-soluble polymers have been widely used in enhanced oil recovery operations. For example, such gelled polymers can be used to alter the permeability of underground formations to enhance the effectiveness of water flooding operations. In a number of application, polymers and appropriate crosslinking agents or systems are injected in an aqueous solution into the underground formation. Preferably, the polymers permeate into regions having the highest water permeability and gel therein. Fluids injected into the formation in subsequent water flooding operations, are, for example, diverted away from the regions in which the gel formed to areas containing unrecovered oil.

It is generally desirable that polymers used in processes for the recovery of oil and other hydrocarbons impart to a liquid an increased viscosity when a relatively small quantity of the polymer is added. The increased viscosity is preferably achieved at a minimal cost. It is also desirable that such polymers form gels, for example, in the presence of a gelling agent such as a crosslinking agent, in the desired underground formations and do not gel before they can effectively penetrate the desired underground formations. Many processes have been developed to delay the gelation of gelling compositions by adding a delaying agent. However, such gelation delaying agents often add significant costs to oil field operation.

Although many polymers have been developed and used in hydrocarbon/oil recovery processes, many of these polymers cannot adequately withstand the hostile environments present in oil recovery. For example, many such polymer are incapable of forming gels having sufficient thermal stability, particularly in harsh environments such as in water containing high salinity.

Many polymer systems currently used in the oil recovery systems also include environmentally undesirable components. For example, in certain systems chromium crosslinking agents are used to produce gels of increased stability. However, a chromium salt is not an environmentally desirable compound and increased costs may be incurred to prevent contamination of ground water sources. Likewise, many conventional crosslinking systems include environmentally undesirable phenolic compound (known to be toxic) and/or formaldehyde (known to be a carcinogen).

It is desirable to develop water-soluble polymers that can be used to prepare crosslinked polymer networks/gels that withstand hostile environments such as those found in hydrocarbon/oil recovery.

SUMMARY OF THE INVENTION

In one aspect, the present invention provides a composition comprising water having a saline content of at least 1 ppt (part per thousand), at least one hydrophilic polymer containing primary (—NH$_2$) and/or secondary (—NHR) amine groups (that is, the hydrophilic polymer contains or includes at least two groups which are independently the same or different a primary amine group or a secondary amine group) and at least one saccharide containing a reducible function. In general, the R substituent upon the secondary amine is not limited. Strong electron withdrawing groups are not preferred as such groups can reduce the nucleophilic nature of the secondary amine. In many cases, R is an alkyl group. The amine groups can be pendant groups on the polymer or incorporated into the polymer backbone. In general, the hydrophilic polymer must include at least two amine groups (per a polymer chain) to enable crosslinking.

The surprising stability of networked polymeric gels of the present invention in waters having high salt content/salinity makes the networked polymeric gels useful for injection into subterranean or underground formations to alter the permeability thereof in, for example, the recovery of oil and/or other hydrocarbons. Moreover, because of environmental concerns as well as cost for disposing of a produced brine (that is, water of relatively high salinity co-produced with oil and gas, which is generally contaminated with some oil, or gas, or both) it may be desirable to utilize produced brine as the liquid/water used for the networked polymeric gels of the present invention. Use of produced brines eliminates the cost associated with acquiring fresh water for use as the liquid and the disposal cost for the produced brine. Although the networked polymeric compositions of the present invention may be particularly suited for use in hydrocarbon recovery, the networked polymeric compositions of the present invention can be used in virtually any device, system or method in which it is desirable to form a crosslinked polymer network in water of relatively high salinity.

The term "salinity" has been defined in a number of manners over the last century. At the simplest level, the term "salinity" refers generally to the total amount of dissolve solids (in grams) in 1000 grams (1 kg) of water, and is described as parts per thousand (ppt). The eleven ions that comprise the majority of the solids in seawater are (in grams per kilogram of water): Chloride (19.135), Sodium (10.76), Sulfate (2.712), Magnesium (1.294), Calcium (0.413), Potassium (0.387), Bicarbonate (0.142), Bromide (0.067), Strontium (0.008), Boron (0.004), and Fluoride (0.001). See, Turekian, Karl. *Oceans*, Englewood Cliffs, N.J.: Prentice-Hall Inc, 1976. However, for a number of reasons it is almost impossible to measure the total dissolved materials in practice (for example, volatile materials such as gases cannot be accurately measured and chlorides are lost in drying). In an effort to avoid such problems, the definition of salinity was revised in 1902 to refer to the total amount of solid materials in grams dissolved in one kilogram of water when all carbonate has been converted to oxide, the bromine and iodine replaced by chlorine and all organic matter completely oxidized.

The above definition is still difficult to implement in practice. In 1966, the Joint Panel on Oceanographic Tables and Standards (appointed by UNSECO and other international organizations) recommended that salinity and chlorinity be related using the formula:

$$S = 1.80655 \, Cl$$

wherein chlorinity Cl is defined as the mass of silver required to precipitate completely the halogens in 0.3285234 kg of a water sample. More recently, conductivity meters have been used to measure salinity. The Practical Salinity Scale of 1978 is currently the official definition of salinity:

$$S_{psu} = 0.0080 - 0.1692 \, R^{1/2}{}_{15} + 25.3851 \, R_T + 14.0941 \, R^{3/2}{}_T - 7.0261 \, R^2{}_T + 2.7081 \, R^{5/2}{}_T + \Delta S$$

$$R_T = C(S,T,0)/C(KCl,T,0)$$

$$\Delta S = [(T-15)/(1+0.0162(T-15))] + 0.005 - 0.0056 \, R^{1/2}{}_T - 0.0066 \, R_T - 0.0375 \, R^{3/2}{}_T + 0.636 \, R^2{}_T - 0.0144 \, R^{5/2}{}_T$$

$$2 \leq S \leq 42$$

wherein C (S, T, 0) is the conductivity of the sea-water sample at temperature T and standard atmospheric pressure, and C (KCl, T, 0) is the conductivity of the standard potassium chloride (KCl) solution at temperature T and standard atmospheric pressure. The standard KCl solution contains a mass of 32.435 6 grams of KCl in a mass of 1.000000kg of solution. An extension of the above equation gives salinity at any pressure. Stewart, R. H, *Introduction to Physical Oceanography*, Department of Oceanography, Texas A & M University, Chapter 6 (August 2003 edition), which is available on the Internet at the following URL: http://oceanworld.tamu.edu/resources/ocng_jextbook/PDF_files/book.pdf. Salinity determined from the Practical Salinity Scale is abbreviated psu, for practical salinity units.

Fresh water typically has a salinity of well less that 1 ppt (or 1000 parts per million, ppm). Indeed, the salinity of fresh water varies widely, but is typically less than 0.5 ppt. On the other hand, seawater typically has a salinity in the range of approximately 20 to 40 ppt, with an average salinity of approximately 35 ppt. While still forming a stable crosslinked network, the compositions of the present invention can incorporate water having a salinity (as measured using The Practical Salinity Scale of 1978) of at least any value in the range of approximately 0.5 to 3 ppt. Further, the compositions of the present invention can incorporate water having a saline content of at least 10 ppt. Still further, the compositions of the present invention can incorporate water having a saline content of at least 20 ppt. Indeed, the compositions of the present invention can incorporate water having a saline content of at least 35 ppt.

Moreover, unlike many networking polymeric systems currently use in hydrocarbon recovery, the networked polymeric gels of the present invention are inherently thermally stable at the temperatures (often in excess of 90° C. or even 110° C.) found in subterranean formations from which such materials are recovered. Indeed, gelation of the networked polymeric gels of the present invention occurs best at temperatures above 80° C. The temperature dependence of the compositions of the present invention can also assist in preventing gelation prior to or too early during injection, thereby reducing or eliminating the necessity of delaying agents and the costs and other problems associated therewith.

The amine functional polymer/reducible saccharide combinations of the present invention have been found to undergo an unexpected cross-linking reaction in water of high salt content upon the application of heat. The polymers used in the compositions of the present invention can be homopolymers and/or copolymers (which are polymerized from two or more dissimilar monomers). As used herein, the term "polymer" refers generally to a compound having multiple repeat units (or monomer units) and includes the term "oligomer," which is a polymer that has only a few repeat units. The term "copolymer" refers to a polymer including two or more dissimilar repeat units (including terpolymers—comprising three dissimilar repeat units—etc.).

Polymers suitable for use in the present invention include, but are not limited to, partially hydrolyzed poly(N-vinylformamide) (that is, a copolymer of NVF and vinylamine), partially hydrolyzed vinyl acetate/NVF copolymer (that is, a polymer with vinyl acetate, vinyl alcohol, NVF and vinylamine repeat units); hydrolyzed acrylonitrile/NVF copolymer; (available as a commercial product from Mitsubishi and containing acrylonitrile, acrylamide, amidine, NVF and vinylamine units), amine functional polyacrylamide (for example, prepared via Hoffman degradation of polyacrylamide), acrylic acid/vinylamine copolymer, maleic anhydride/maleic acid copolymers with NVF/vinylamine, NVF/vinylamine polymers with vinyl sulfonate comonomer units, allylamine/diallylamine polymers and copolymers, urea/formaldehyde and melamine/formaldehyde condensation polymers, amidoamine polymers (prepared from dicarboxylic acids and polyfunctional amines), amine/epichlorohydrin polymers, poly(ethyleneimine), hydrolyzed or partially hydrolyzed poly(2-alkyl-2-oxazoline) poly(diallyl dimethyl ammonium chloride), diallyl dimethyl ammonium chloride/acrylamide copolymer, diallyl dimethyl ammonium chloride/diallyl amine copolymer, and diallyl dimethyl ammonium chloride/allyl amine copolymer. One hydrophilic polymer or a mixture of two or more such polymers can be used in compositions of the present invention.

In one embodiment, the hydrophilic polymer is at least one of poly(diallyl dimethyl ammonium chloride), diallyl dimethyl ammonium chloride/acrylamide copolymer, diallyl dimethyl ammonium chloride/diallyl amine copolymer, or diallyl dimethyl ammonium chloride/allyl amine copolymer. In the case that the hydrophilic polymer is diallyl dimethyl ammonium chloride/acrylamide copolymer, diallyl dimethyl ammonium chloride/diallyl amine copolymer, or diallyl dimethyl ammonium chloride/allyl amine copolymer, the content of diallyl dimethyl ammonium chloride in the copolymer can be at least 50 weight percent. A relatively high concentration of diallyl dimethyl ammonium chloride generally increases water solubility. The content of diallyl dimethyl ammonium chloride in the copolymer can also be at least 70 weight percent. Moreover, the content of diallyl dimethyl ammonium chloride in the copolymer can further be at least 80 weight percent. Of the above diallyl dimethyl ammonium chloride copolymers, preferred copolymer are diallyl dimethyl ammonium chloride/diallyl amine copolymer and diallyl dimethyl ammonium chloride/allyl amine copolymer.

As clear to one skilled in the art, the hydrophilic polymers of the present invention are readily synthesized as homopolymers or copolymers (including terpolymers etc.) prepared from, for example, mono- or di-unsaturated (that is, including one or two carbon-carbon double bonds) primary and secondary amines or amine monomers. Copolymerization can occur with, for example, unsaturated amides, carboxylic acids, anhydrides, sulfonic acids, hydrolyzed amides, and/or condensation polymers. Depending upon the chemical structure of the hydrophilic polymer(s) used in the compositions, the compositions of the present invention can form a covalently crosslinked polymer network or an ionically crosslinked polymer network.

In general, polymers having a broad range of number average molecular weight (Mw) are suitable for use in the present invention. Preferably, the molecular weight of the polymers is at least approximately 500. More preferably, the molecular weight is in the range of approximately 30,000 to approximately 1,000,000. Polymers having molecular weight in excess of 100,000 can be used, but water solubility of certain polymers typically decreases for such polymers as molecular weight increases beyond approximately 100,000.

The reducible saccharides used in the present invention can be monosaccharides, disaccharides, trisaccharides etc, (for example, sugars) or polysaccharides (for example, starch or cellulose). Polysaccharides are typically a combination of nine or more monosaccharides. Reducible saccharides or reducing saccharides include a reducing group, function or functionality which is typically an aldehyde group (—C(O)H) or a hemiacetal group

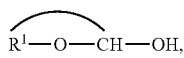

which is another form of an aldehyde when the saccharide is in a cyclic conformation. Examples of reducing saccharides suitable for use in the present invention include, but are not limited to, the sugars glucose, lactose, and 2-deoxy-D-ribose. To decrease costs, the saccharide is preferably a monosaccharide (for example, glucose), a disaccharide (for example, lactose) or a polysaccharide (for example, starch).

The composition can, for example, further include a base. Examples of suitable bases include, but are not limited to, sodium hydroxide, potassium hydroxide, ammonia or calcium carbonate.

In one embodiment, the polymer is a copolymer of vinyl amine and vinyl alcohol. Preferably, the copolymer is at least 0.5% by weight of vinyl amine. More preferably, the copolymer is at least 3% by weight of vinyl amine. Even more preferably, the copolymer is at least 6% by weight of vinyl amine. Copolymers having well in excess of 6% by weight of vinyl amine are suitable for use in the present invention. In several embodiments for example, copolymer can be at least 12% by weight of vinyl amine.

A broad range of mole ratios of amine to reducing saccharide is suitable for use in the present invention. In one embodiment, the mole ratio of amine groups to reducing saccharide is in the range of approximately 1:4 to approximately 8:1. Preferably, the mole ratio of amine groups to reducing saccharide is in the range of approximately 1:2 to approximately 8:1. In general, increasing amine content results in stiffening of the resultant gel. One skilled in the art can readily determine an appropriate amine content for a desired set of properties for the resultant gel.

In another aspect, the present invention provides a method of changing the permeability of a subterranean formation including the step of injecting into a subterranean formation a composition comprising water, at least one hydrophilic polymer containing at least two groups which are independently the same or different a primary amine group or a secondary amine group and at least one saccharide containing a reducible function. The water can be "fresh" water (that is water, typically having a salinity of less than 0.5 ppt) or can be water of relatively high salinity (that is, greater than 0.5 ppt) as discussed above. In one embodiment, the composition is formed at a temperature below approximately 50° C., or more typically, at room temperature or below (that is, at approximately 25° C. or below) and subsequently heated in/by the environment of the subterranean formation to induce cross-linking.

In still a further aspect, the present invention provides a method of a fluid (for example, a hydrocarbon such as oil) from a subterranean formation including the step of injecting into a subterranean formation a composition comprising water, at least one hydrophilic polymer containing at least two groups which are independently the same or different a primary amine group or a secondary amine group and at least one saccharide containing a reducible function.

The compositions of the present invention can be injected as individual components or as a pre-gel made by the partial reaction of the polymer(s) or copolymer(s) and the reducible saccharide component(s). No toxic crosslinking agents, oxidizing agents, phenolic compounds, formaldehyde or organohalo compounds are required in the compositions and methods of the present invention. In general, no environmentally undesirable components are used in the compositions and methods of the present invention.

DETAILED DESCRIPTION OF THE INVENTION

Figure 1:
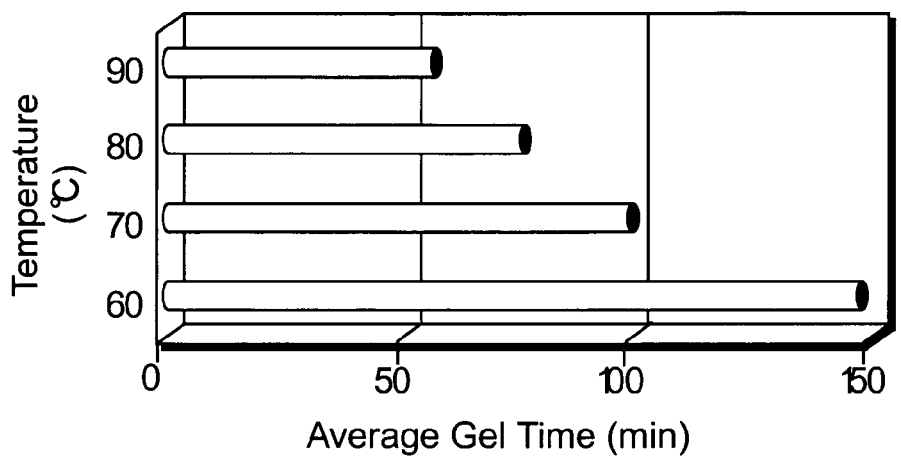
FIG. 1 illustrates a study of gel time at various temperatures for a composition including a copolymer of vinyl amine and vinyl alcohol (6 wt % vinyl amine) and D-glucose at a 1:1 sugar/copolymer ratio.

In the present invention, environmentally friendly or benign compositions are formed that can, for example, be used to change the permeability characteristics of subterranean or underground formations (for example, in the recovery of oil and/or other hydrocarbons). In several embodiment of the present invention, when individual polymer chains of the compositions of the present invention interact, chemical or physical crosslinking may occur. This crosslinking results in a three-dimensional highly branched network of polymers. When these networks become swollen with water (that is, either fresh/deionized water of brine) they form hydrophilic gels.

The present inventors have discovered that water soluble polymers having primary and/or secondary amine groups form networked gels in the presence of a reducing saccharide such as a reducing sugar. Reducing sugars are sometimes referred to herein simply as sugars. Similar networked or crosslinked polymers gelled in fresh water for use in strengthening paper are discussed in U.S. patent application Ser. No. 10/252,262, filed Sep. 23, 2002, the disclosure of which is incorporated herein by reference. Surprisingly, it has been discovered that networked gels formed from compositions including polymers having primary and/or secondary amine groups and a reducing saccharide are quite stable in harsh environments such as experienced in subterranean hydrocarbon recovery which may include, for example, seawater, brackish water or brine (that is, water of high salinity or salt content) and temperatures in excess of 90° C.

Several representative examples of the present invention are described using compositions including polymers with vinyl amine repeat groups and at least one of several reducing sugars. Vinyl amine homopolymer was found to form relatively stable networked gels in the presence of a reducing sugar in both deionized water and water having high salinity/salt content (simulated seawater). In the studies of the present invention in water having high salinity/salt content, simulated seawater was prepared using procedures similar to those set forth in ASTM Standard D 1141-98, Standard Procedure for the Preparation of Substitute Ocean Water, the disclosure of which is incorporated herein by reference. Use of simulated seawater in the gelation studies of the present invention was found to have little, if any, effect upon gelation results as compared to studies carried out with deionized water.

Copolymers of vinyl amine and at least one other monomer were also found to form networked gels in the presence of a reducing sugar. In many instances, use of a copolymer of vinyl amine and at least one other monomer is preferable to use of a vinyl amine homopolymer in the present invention given the expense of the vinyl amine monomer. In a number of studies of the present invention, representative copolymers of vinyl amine and vinyl alcohol were used. Such copolymers are also sometimes referred to herein as poly(vinylalcohol)/poly(vinylamine) or PVOH/PVAm copolymers.

Aqueous solutions (including either fresh/deionized water or simulated sweater) of poly(vinylalcohol)/ poly(vinylamine) copolymer and a number of sugars were found to gel readily at temperatures between, for example, approximately 50 and 100° C. In a series of initial experiments, known amounts of sugars were mixed with a copolymer of vinyl amine and vinyl alcohol (12 wt % vinyl amine) to form a 40% solution (in water) by weight. The mixtures were heated to various temperatures and held for varying lengths of time. relation was determined to be the point where a Teflon stir bar ceased to move.

Vinyl amine is required for gelation to occur. In that regard, homopolymers of vinyl alcohol did not gel in the presence of sugar at elevated temperature. Homopolymers of vinyl amine or copolymers of vinyl amine and vinyl alcohol gelled readily under these conditions. Reducing saccharide (for example, sugar) is also required for gelation—vinyl amine homopolymers and copolymers of vinyl amine and vinyl alcohol did not gel without the presence of sugar. Gelation occurs over a wide range of amine: sugar (saccharide) ratios.

Gelation occurred in the presence of 2-deoxy-D-ribose, suggesting that the osazone mechanism was not responsible for crosslinking. On the other hand, gelation did not occur when using sucrose, suggesting that Maillard chemistry (known from food chemistry) is involved in the crosslinking and hence gelation. Prior studies suggest that no mutagenicity results from products of the Maillard reaction when disaccharides are employed. Lactose, for example, allows for gelation in the compositions and systems of the present invention. Although it is believed that the Maillard chemistry is involved in gelation in the compositions of the present invention, the present invention is not limited to any particular mechanism of gelation.

Figure 2:
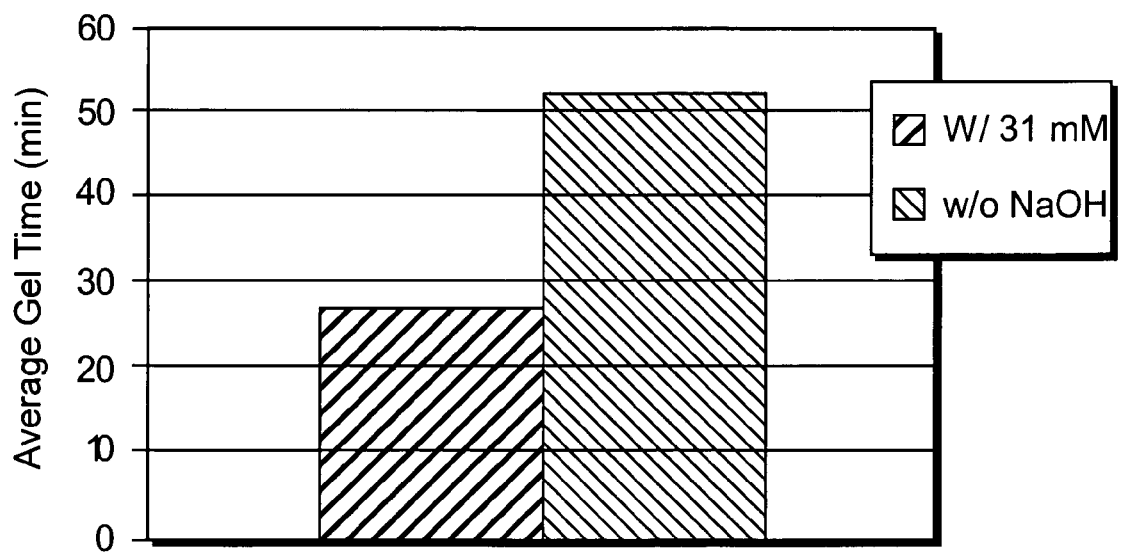
FIG. 2 illustrates the effect of addition of base upon gel time.

Increasing temperature increases the rate of the reaction/ gelation. In several experiments with a 12% (wt) amine sample, for example, the time for gelation dropped with increasing temperature from 335 minutes (50° C.) to 113 minutes (60° C.) to 50 minutes (70° C.) to 24 minutes (80° C.) to less than 10 minutes at (90° C.). FIG. 1 illustrates graphically the effect of increasing temperature on gel time for a copolymer of vinyl amine and vinyl alcohol having 6% (wt) vinyl amine. Addition of acid (for example, $H_2SO_4$) slowed the gelation reaction, while addition of a base (for example, NaOH) accelerated the gelation reaction (see FIG. 2).

Figure 3:
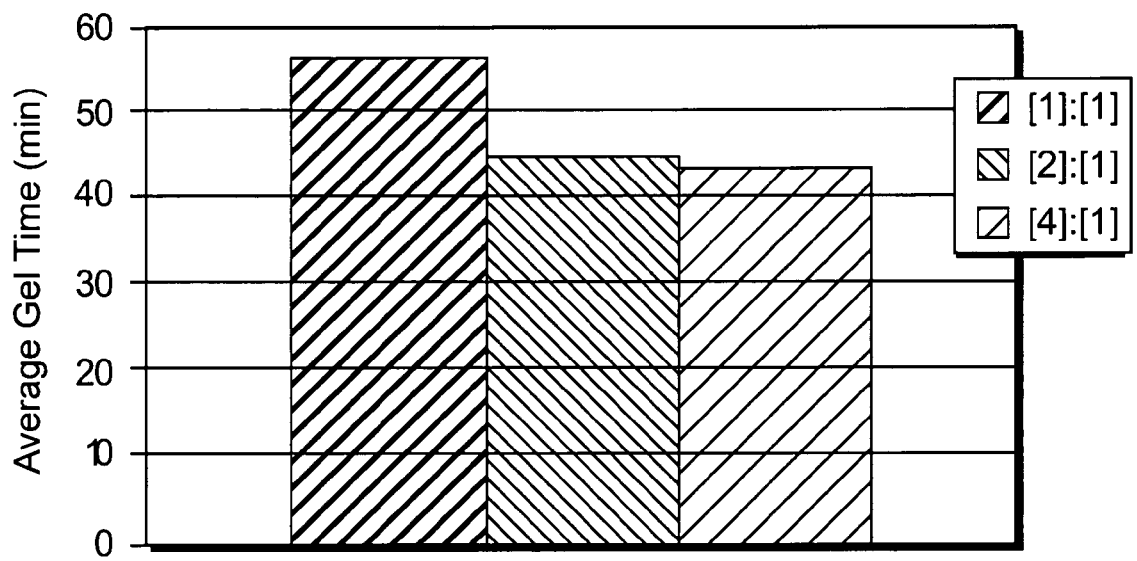
FIG. 3 illustrates a study of gel time at various sugar:copolymer ratios for a composition including a copolymer of vinyl amine and vinyl alcohol and D-glucose.
Figure 4:
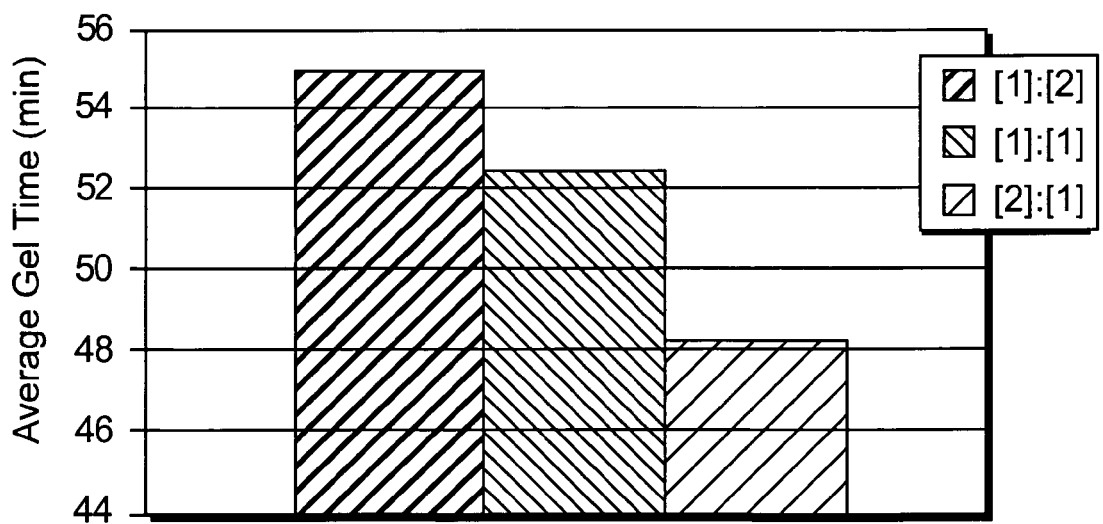
FIG. 4 illustrates a study of gel time at various sugar:copolymer ratios for a composition including a copolymer of vinyl amine and vinyl alcohol and lactose.
Figure 5:
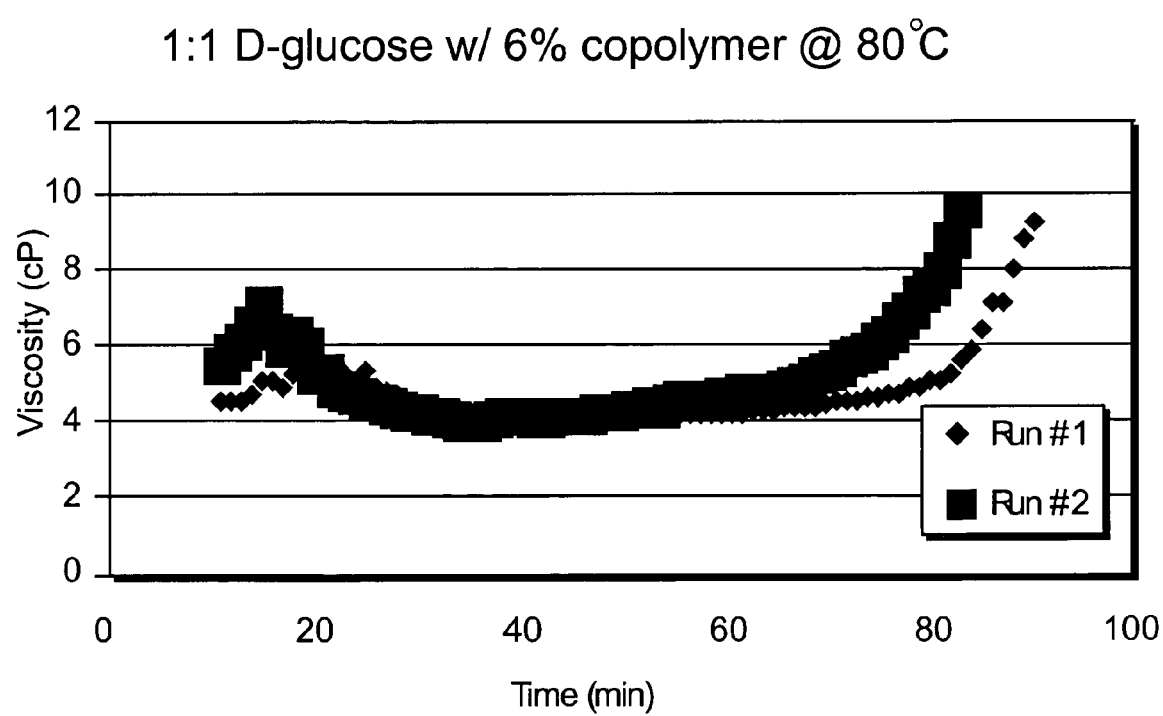
FIG. 5 illustrates the viscosity of a composition including a copolymer of vinyl amine and vinyl alcohol (6 wt % vinyl amine) and D-glucose at a 1:1 sugar/copolymer ratio as a function of time.

FIGS. 3 and 4 illustrate studies of the effect of mole ratio of sugar to copolymer (6% by weight amine) for D-glucose and lactose, respectively. In general, sugar concentration only slightly effected gel time. Moreover, the type of sugar used did not greatly affect gelation time. Lactose was found to be slightly better than D-glucose in these studies.

The gelation of several other hydrophilic polymers and copolymers was studied in deionized water and in synthetic seawater. For example, poly(diallyl dimethyl ammonium chloride) [DADMAC] homopolymers were studied. The PolyDADMAC materials, for example, gelled in deionized water and in seawater at 90° C. and 1:1 sugar:PolyDADMAC ratio under basic conditions. These gels were associative in nature, crosslinking though ionic interactions rather than through covalent crosslinking bonds. The gelation of the polyDADMAC compositions was reversible. Upon addition of aqueous acid, for example, PolyDADMAC gels rapidly fell apart (dissolved). The PVOH-PVA gels discussed above are, in comparison, permanent in nature (that is, the PVOH/PVA gels comprise covalent crosslinks).

Compositions of the present invention including copolymers of DADMAC and acrylamide, diallyl amine, and allyl amine (all in 90:10 DADMAC/comonomer ratio) were also evaluated in deionized water and in simulated seawater (at 90° C. and 1:1 sugar:copolymer ratio under basic conditions). Each of the compositions appeared to have gelled. The compositions gelled more slowly than the PVA-PVOH copolymers discussed above. Upon gelation, the DADMAC/ acrylamide composition became very viscous or gooey. The DADMAC/acrylamide starting material, however, was quite viscous, and gelation was thus difficult to determine. The DADMAC/diallyl amine composition became somewhat more viscous than the DADMAC/acrylamide composition. The DADMAC/allyl amine formed a stiff gel (similar in properties to that formed with the PVOH-PVA copolymers). The monomer structures and associated polymer repeat units of the DADMAC homopolymer and copolymers are set forth in Table 1. Several of the properties of the copolymers studied are set forth in Table 2. The concentration of DADMAC in the copolymer backbone was maintained relatively high to increase the solubility of the copolymers in water.

TABLE 1

Repeat Units of DADMAC and Amine Based Co-Polymers

| Name | Unit | Polymer Repeat Unit | Weight g/mol |
|---|---|---|---|
| Acrylamide | [structure: CH$_2$=CH–C(=O)–NH$_2$] | [structure: –[CH$_2$–CH(C(=O)NH$_2$)]–] | 71 |

TABLE 1-continued

Repeat Units of DADMAC and Amine Based Co-Polymers

| Name | Unit | Polymer Repeat Unit | Weight g/mol |
|---|---|---|---|
| Diallylamine | (structure) | (structure) | 69 |
| Allylamine | (structure) | (structure) | 57 |
| Diallyldimethyl-aluminumchloride (DADMAC) | (structure) | (structure) | 161.5 |

TABLE 2

| Comonomer | % DADMAC | % of various Amine polymer | % Solids | Bulk Viscosity Cp |
|---|---|---|---|---|
| Acrylamide | 90 | 10 | 40 | 13000 |
| Diallylamine | 90 | 10 | 40 | 1140 |
| 10-Allylamine | 90 | 10 | 40 | 1360 |

Experimental

Materials. All chemicals were used without further purification. Poly(vinylalcohol) (98-99%, $M_w$ 31,000-50,000), D-glucose (A.C.S. reagent) and 2-deoxy-D-ribose (97%) were purchased from Aldrich Chemical Co. Sucrose (A.C.S. reagent) was purchased from J. T. Baker Chemical. Lactose (A.C.S. reagent) was purchased from E. M. Science. L-ribose (99.5%) was purchased from Acros Organics. The poly(vinylalcohol)/poly(vinylamine) copolymers (6 and 12% amine, medium $M_w$) were donated by Air Products.

Instrumentation. Infrared spectra (IR) were obtained on an ATI Mattson FTIR spectrometer. Information obtained was used to determine chemical changes occurring during gelation.

Synthesis of poly(vinylamine). Poly(vinylamine) was synthesized using N-vinyl formamide (NVF). First poly(vinylformamide) (PNVF) was made by combining 100 mL of the NVF monomer, 40 mL of DMSO solvent, 61 mg Vazo 88 initiator (cyclohexane carbonitrile), and 0.5 g RAFT agent in a three-neck flask. The mixture was then heated at 100° C. for ~2 hours under nitrogen gas with constant stirring and with reflux conditions. After heating, the product was diluted in a 50 mL/50 mL water/ethanol mixture. The product was then precipitated out of solution using acetone. Product was dried overnight in a vacuum oven, redissolved in a 120 mL/50 mL water/ethanol mixture and subsequently precipitated using acetone. The PNVF was hydrolyzed under basic conditions by combining the polymer, concentrated NaOH (5% excess) and distilled deionized water in a round bottom flask. The mixture was then heated at 80° C. for 18 hours, under reflux conditions and with constant stirring. Adding HCl to the cold product solution precipitated the product. The product was then washed with methanol three times and dried in a vacuum oven. HCl was removed by adding aqueous NaOH. This product was precipitated in acetone, dried and then washed with butanol.

EXAMPLES

Example 1

An aqueous solution was prepared by dissolving 7.5 g D-glucose and 2.5 g poly(vinylalcohol) (PVOH) into distilled, deionized water in a 25 mL volumetric flask. The solution was clear with some undissolved polymer. It was, however, pourable. The solution was transferred to a round bottom flask and heated to 80° C. in an oil bath. Heating was done with constant stirring and under reflux conditions. Upon completion the solution remained clear with all polymer dissolved and was still pourable.

Example 2

Prior studies suggest that an aqueous solution of PVOH and D-glucose could be used to form hydrogels by using freezing/thawing cycles. See Yamaura, K.; Fukada, M.; Tanaka, T.; Tanigami, T. *J. of Applied Polymer Science.* 1999, 74, 1298-1303. To study this effect, a solution was prepared as in example 1. Heating was carried out using the same procedure as in example 1, but was allowed to reach a temperature of 90° C. The aqueous solution was then placed in a −10° C. freezer over 48 hours. After thawing the solution at room temperature for 1 hour a weak, white hydrogel had formed. The gel was then placed back in the freezer for 24 hours and then thawed at room temperature for 1 hour. After which, the gel appeared visibly stronger. This gel was found to be soluble in water heated up to 49° C. Neither swelling nor dissolution was noted when placed in 1M HCl.

Example 3

Prior studies further suggest that D-glucose was not necessary for the gelation of poly(vinylalcohol) using the process in example 2. See Yamaura, K.; Karasawa, K. I.;

Tanigami, T.; Matsuzawa, S. *J. of Applied Polymer Science.* 1994, 51, 2041-2046. To study such gelation, a 2.5 g of PVOH was dissolved in distilled, deionized water in a 25 mL volumetric flask. Heating was carried out using the same procedure as in example 1, but was allowed to reach a temperature of 95° C. The solution was then placed in the freezer at −25° C. for 48 hours. After 1 hour of thawing at room temperature a gel, similar in appearance to the gel in Example 2, was produced. The inability of PVOH to form hydrogels without the freezing/thawing cycle indicated that the amine groups on copolymers of PVOH and Poly(vinylamine) in the compositions of the present invention are responsible for gelation.

Example 4

Poly(vinylamine) (PVA) was also used in trying to make gels. An excess of PVA was used in the case that some butanol was still present in the synthesized polymer. 2.8 g of PVA was dissolved in distilled, deionized water in 25 mL volumetric glassware leaving room for the addition of D-glucose and more water. A heating gun was used, as needed, to dissolve polymer. D-glucose was dissolved in some water in a separate container, added to the other solution and diluted as necessary. This solution was orange in color and pourable. Heating was carried out using the same procedure as in example 1, but was allowed to reach a temperature of 100° C. A rubbery, dark brown gel began to appear at ~95° C. This gel swelled when exposed to both excess water and 1M HCl.

Example 5

To ensure that the discoloration observed in Example 4 was a result of gelation and not merely oxidation of the amine, Example 4 was repeated under nitrogen gas. This was done using a three neck flask, rubber septum and needle. The rubbery, dark brown gel appeared at ~93° C. again. This gel was slightly lighter in color than the gel of Example 5. This gel swelled in water and in 1M HCl.

Example 6

To study whether a sugar was necessary for gelation, 1.25 g of PVA was dissolved in water in a 25 mL volumetric flask. This solution was then heated to 95° C. using the procedure of Example 1. No gelation was observed.

Example 7

The poly(vinylalcohol)/poly(vinylamine) copolymer that was used for the experiments set forth in Examples 7 through 24 contained 12% amine groups. 2.5 g of the copolymer followed by 7.5 g of D-glucose were dissolved in distilled deionized water using the procedure outlined in Example 4. This solution was then transferred to a three-neck flask and heated in an oil bath to 100° C. Heating was carried out under reflux conditions, with constant stirring and under argon gas. A strong, bright yellow gel appeared at ~90° C. This gel swelled when exposed to excess water and to 1M HCl.

Example 8

The procedure in example 7 was repeated using 2.5 g D-glucose. This is a 1:2 mole ratio of amine groups to sugar molecules. Gelation began to occur at ~90° C. This gel was strong and yellow. It swelled in water and 1M HCl.

Example 9

The procedure of Example 7 was repeated using 1.25 g D-glucose (a 1:1 mole ratio of amine groups to sugar molecules). Gelation began to occur at ~90° C. This gel was a pale yellow color. This gel is still strong but not as strong as the previous two examples. Swelling was noted in water and 1M HCl. IR spectra were taken of the aqueous solution before heating and of this gel afterwards. Before heating a strong peak was seen around 1680 cm$^{-1}$, which is typical of a primary amine peak. After heating this peak became much smaller, more typical of a secondary amine. Another unidentified peak appeared after heating at ~1090 cm$^{-1}$.

Example 10

The procedure of Example 7 was repeated using 0.61 g D-glucose (a 2:1 mole ratio of amine groups to sugar molecules). Gelation began to occur at ~95° C. This gel was strong yet somewhat sticky and a clear yellow color. Swelling was noted when exposed to water and to 1M HCl.

Example 11

The procedure of Example 7 was repeated using 0.31 g D-glucose (a 4:1 mole ratio of amine groups to sugar molecules). Gelation began to occur at ~100° C. The gel produced was sticky and almost clear in color. This gel swelled when exposed to excess water and to 1M HCl.

Example 12

The procedure of Example 7 was repeated using 0.16 g D-glucose (a 8:1 mole ratio of amine groups to sugar molecules). Gelation began to occur at ~100° C. This gel was sticky and clear. Swelling occurred when exposed to water and to 1M HCl.

Example 13

To test for the possibility of an osazone mechanism L-ribose was used instead of D-glucose. The procedure followed was similar to that of example 9 (using a 1:1 mole ratio and the same conditions). 1.02 g of L-ribose was used. Gelation occurred at ~85° C. This gel was strong, sticky and bright orange in color. This gel swelled when exposed to excess water and to 1M HCl.

Example 14

As part of the aforementioned test of reaction mechanism 2-deoxy-D-ribose was also used instead of D-glucose. The procedure of Example 9 was once again followed, this time using 0.91 g of 2-deoxy-D-ribose. Gelation occurred at ~85° C. This gel was also strong and bright orange. The gelation of 2-deoxy-D-ribose indicates that the osazone reaction is not taking place since it would be unable to occur as a result of the structure of this sugar. Without limitation to any particular reaction mechanism in the present invention, a Maillard reaction mechanism is thus indicated. The gel of this example swelled when exposed to excess water and to 1M HCl.

Example 15

Figure 6:
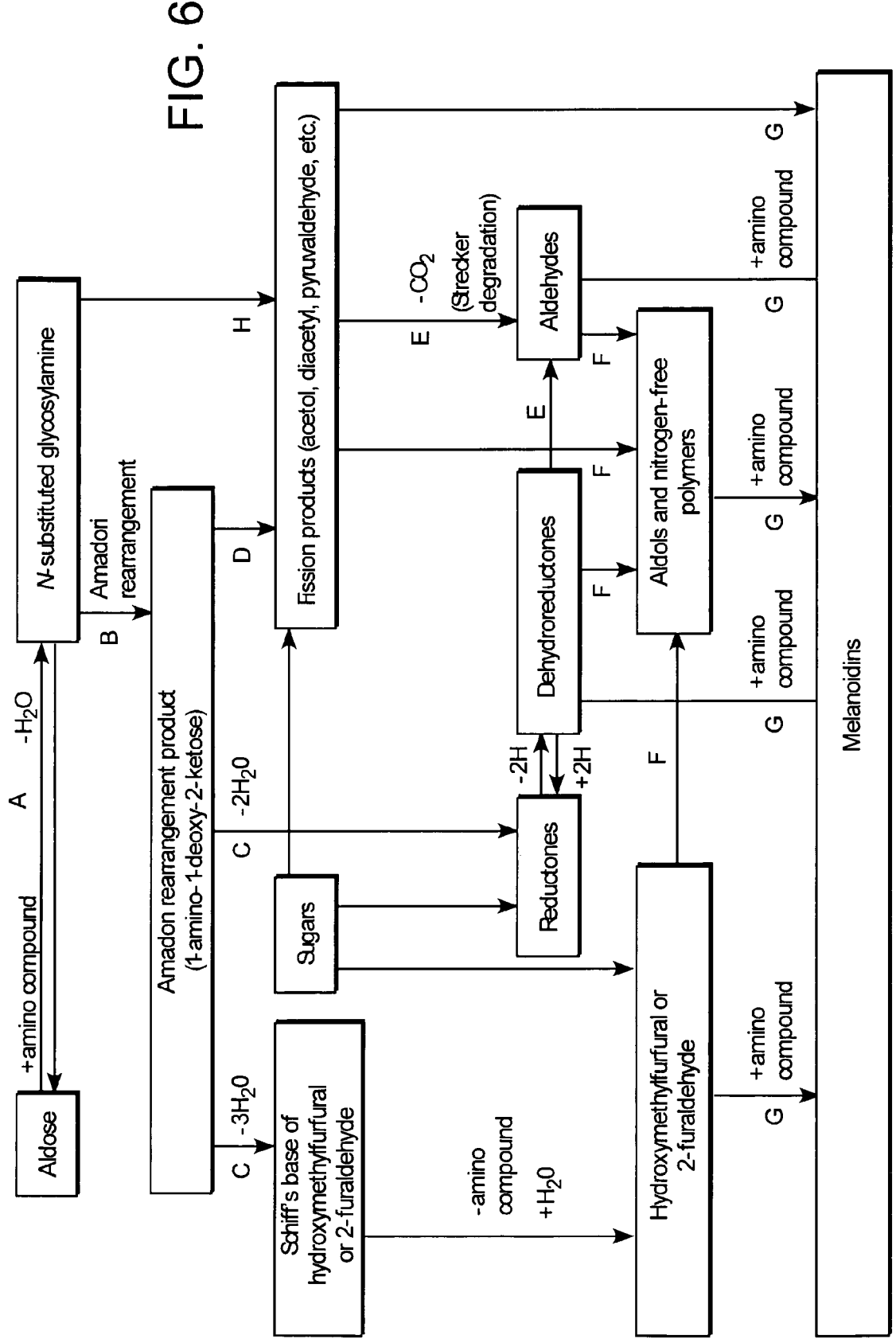
FIG. 6 sets forth a schematic representation of a Maillard reaction.

Prior studies show that little or no mutagenicity results from the Maillard reaction when disaccharides, such as lactose, are involved. See, for example, Brands, C. M. J.; Alink, G. M.; vanBoekel, M. A. J. S.; Jongen, W. M. F. *J. Agric. Food Chem.* 2000, 48, 2271-2275. A summary of the Maillard reaction is provided in FIG. 6. Thus lactose is a good sugar for use in the present invention. The procedure of Example 9 was used, with 2.45 g of lactose. A strong, orange gel formed at ~100° C. Solubility tests were not carried out on this gel.

Example 16

Sucrose is a disaccharide lacking active carbonyl groups. Therefore, sucrose would not be able to form a gel via the Maillard reaction. See Baynes, J. W.; Monnier, V. M. "The Maillard Reaction in Aging, Diabetes and Nutrition" 1989; and O'Brien, J.; Nursten, H. E.; Crabbe, M. J. C.; Ames, J. M. "The Maillard Reaction in Foods and Medicine" 1998. The procedure from example 9 was once again repeated. In this example, time 2.33 g of sucrose was used. The temperature was taken up to 115° C. and gelation was not observed.

Example 17

Constant temperature experiments were also carried out. 2.5 g of copolymer followed by 1.25 g of D-glucose were dissolved in water using a 25 mL volumetric flask as outlined in Example 4. Heating took place in an oil bath that was maintained at a constant temperature of 80° C. Heating was done under reflux conditions, under argon gas and with constant stirring. Gelation time was noted as the time when the gel became too viscous for the stir bar to move. In this example gelation time was found to be 23.5 minutes. The gel produced was a clear yellow and sticky. This gel dissolved in water.

Example 18

The procedure of Example 17 was repeated using an oil bath at 70° C. Gelation time was noted as 49.5 minutes. This gel was weaker and stickier than the previous one. This gel also dissolved in water.

Example 19

The procedure of Example 17 was repeated using an oil bath at 60° C. Gelation time was noted as 113.25 minutes. This gel was weaker and stickier than the previous one. This gel also dissolved in water.

Example 20

The procedure of Example 17 was repeated using an oil bath at 50° C. Gelation time was noted as 335.0 minutes. This gel was weaker and stickier than the previous one. This gel also dissolved in water.

Example 21

To test the effect of pH on gelation, the procedure of Example 17 was repeated under acidic conditions. Three drops of concentrated $H_2SO_4$ were added to the aqueous solution. After 120.0 minutes the solution had turned slightly yellow and appeared to be a pourable gel. This gel was also soluble in water.

Example 22

Basic conditions were also examined using the procedure in example 17. 0.04 g of concentrated NaOH were added to the aqueous solution. Gelation was noted after 18.2 minutes. This gel was similar in appearance to that produced in Example 17. This gel was slightly soluble in excess water.

Example 23

The gels studied in FIGS. 1 through 5 were synthesized in a consistent manner. In that regard, 21.25 grams of copolymer was weighed out into a beaker and set aside for both 6 wt % and 12 wt % amine copolymers. The sugar was also weighed out in a beaker and set aside. The amount of sugar added depended on the mole ratio of sugar to amine, which is indicated in Table 3 below for each ratio.

TABLE 3

| Molar Ratio (sugar:amine) And Type of Sugar | Amount of Sugar (grams) |
| --- | --- |
| 1:1 glucose | 5.23 |
| 2:1 glucose | 10.46 |
| 4:1 glucose | 20.92 |
| 1:2 lactose | 5.23 |
| 1:1 lactose | 10.46 |
| 2:1 lactose | 20.92 |

The saccharide (sugar):amine rations set forth in Table 3 and FIGS. 3 and 4 are merely the reciprocal of amine:sugar mole ratios.

Water (deionized water or simulated seawater) was measured out in a tall form beaker to approximately 425 mL. A small amount (~¼) of this water was put into another tall form beaker and the sugar was added and mixed thoroughly. The bulk of the water was used to mix with the copolymer. The mixture of copolymer/water was then put into an oil bath and mixed to allow the copolymer to dissolve. Next, the sugar/water mixture was added into the copolymer mixture and the time was started. The UL adapter was then lowered into the mixture and the Brookfield viscometer was turned on to a speed of 60 (The Brookfield viscometer had been earlier calibrated with water). The readings form the Brookfield were not recorded until after the time had reached 9 minutes to allow the UL adapter to settle. The time was then recorded after each minute. The only other change in procedure occurred when the NaOH was added [50% (w/w/) NaOH in water solution]. 31 mM of NaOH (or 1 gram of the NaOH in water solution) was added into the sugar/water mixture before adding it to the copolymer mixture.

Example 24

Synthetic or simulated seawater was prepared with reference to ASTM Standard D 1141-98 Standard Practice of the Preparation of Substitute Ocean Water. Unlike the solution prepared in the ASTM standard, the synthetic seawater used in the studies of the present invention was not prepared by mixing of separate stock solutions, but by direct mixing of the items listed in Table 4 to achieve the approximate concentrations set forth in Table 4. The minor component compounds $H_3BO_3$, $SrCl_2$ and NaF of the ASTM standard (having concentrations of 0.027 g/L, 0.025 g/L and 0.003 g/L in the ASTM standard) were not added.

ASTM Standard D 1141-98 (2003) indicates the chlorinity of the resultant synthetic ocean or seawater to be 19.38 ppt, which is approximately equivalent to a salinity of 35.01 ppt (using the equation S=1.80655 Cl).

TABLE 4

| Compound | Concentration (g/L) |
| --- | --- |
| NaCl | ~24.5 |
| MgCl$_2$ | ~5.2 |
| Na$_2$SO$_4$ | ~4.1 |
| CaCl$_2$ | ~1.2 |
| KCl | ~0.7 |
| NaHCO$_3$ | ~0.2 |
| KBr | ~0.1 |
| H$_3$BO$_3$ | 0 |
| SrCl$_2$ | 0 |
| NaF | 0 |

Example 25

In a representative example of synthetic procedure of a poly(diallyl dimethyl ammonium chloride) (DADMAC)/allyl amine copolymer of the present studies, the reaction was carried out in a 1 L, four-necked resin pot equipped with a mechanical stirrer, a thermometer, a condenser, a purge tube and a heat regulator. Approximately 492 g of a 55% aqueous monomer solution including 75 wt % DADMAC and 25 wt % allyl amine was added to the reaction vessel and stirring commenced. The pH was then adjusted to approximately 6.0 by addition of dilute HCl. The resultant reaction mixture was heated to 50° C. and purged with nitrogen for 1 hour. Subsequently 500 ppm of sodium EDTA (based upon the weight of the reaction mixture) was added, followed by addition of 1.5×10$^{-2}$ mole t-butly peroxypivalate per mole of monomer. The temperature of the reaction mixture was maintained at 50° C. for 10 hours.

Example 26

Poly(diallyl dimethyl ammonium chloride) (DADMAC) homopolymers at 5 wt % were gelled in seawater at 90° C. and 1:1 sugar:DADMAC under basic conditions. Gelation was observed. Upon addition of aqueous acid the gels rapidly fell apart (dissolved), indicating that the gels were associative in nature.

Example 27

Several experiments were performed to observe the crosslinking reaction of diallyl dimethyl ammonium chloride/acrylamide copolymer, diallyl dimethyl ammonium chloride/diallyl amine copolymer, and diallyl dimethyl ammonium chloride/allyl results from products of the Maillard reaction when disaccharides are employed. Lactose, for results from products of the Maillard reaction when disaccharides are employed. Lactose, for amine copolymer at 5 wt % in seawater at 90° C. and at a 1:1 sugar:copolymer ratio. The allyl amine co-polymer, for example, resulted in a relatively stiff polymer network. Addition of water to the polymer network resulted in gelation/expansion to well over 500% the original volume. The resultant gel was a very viscous monolithic type gel. The polymer was subsequently heated to remove the seawater, followed by addition of more seawater to determine if the process of expansion was repeatable. These studies indicated that the gel was able to be "expanded" and "compressed" multiple times.

The foregoing description and accompanying drawings set forth preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A method of changing the permeability of a subterranean formation comprising the step of injecting into a subterranean formation a composition comprising water, at least one hydrophilic polymer containing at least two groups which are independently, the same or different, a primary amine group or a secondary amine group and at least one sugar containing a reducible functional group.

2. The method of claim 1 wherein the water has a salinity of at least 1 ppt.

3. The method of claim 1 wherein the water has a salinity of at least 3 ppt.

4. The method of claim 1 wherein the water has a salinity of at least 10 ppt.

5. The method of claim 1 wherein the water has a salinity of at least 10 ppt.

6. The method of claim 1 wherein the water has a salinity of at least 35 ppt.

7. The method of claim 1 wherein the reducing sugar is a monosaccharide or a disaccharide.

8. The method of claim 1 wherein the polymer is partially hydrolyzed poly(N-vinylformamide), partially hydrolyzed vinyl acetate/N-vinylformamide copolymer, hydrolyzed acrylonitrile/N-vinylformamide copolymer, amine functional polyacrylamide, acrylic acid/vinylamine copolymer, maleic anhydride/maleic acid copolymers with N-vinylformamide/vinylamine, N-vinylformamide/vinylamine polymers with vinyl sulfonate comonomer units, allylamine polymer, diallylamine polymer, allylamine/diallylamine copolymer, urea/formaldehyde condensation. polymers, melainine/formaldehyde condensation polymers, amidoamine polymers, amine/epichlorohydrin polymers, poly(ethyleneimine), hydrolyzed poly(2-alkyl-2-oxa.zoline), partially hydrolyzed poly(2-alkyl-2-oxazoline), ammonium chloride), diallyl dimethyl ammonium chioride/acrylamide copolymer, diallyl dimethyl ainmonium chloride/diallyl amine copolymer, or diallyl dimethyl ammonium chioride/allyl amine copolymer.

9. The method of claim 1 wherein the polymer is a copolymer of vinyl amine and at least one other monomer.

10. The method of claim 9 wherein the copolymer is at least 0.5% by weight of vinyl amine.

11. The method of claim 9 wherein the copolymer is at least 3% by weight of vinyl amine.

12. The method of claim 9 wherein the copolymer is at least 6% by weight of vinyl amine.

13. The method of claim 9 wherein the copolymer is at least 12% by weight of vinyl amine.

14. The method of claim 1 wherein the mole ratio of amine to reducing sugar is in the range of approximately 1:4 to approximately 8:1.

15. The method of claim 1 wherein the hydrophilic polymer is diallyl dimethyl ammonium chloride/acrylamide copolymer, diallyl dimethyl ammonium chioride/diallyl amine copolymer or diallyl dimethyl ammonium chioride/allyl amine copolymer.

16. The method of claim 9 wherein the hydrophilic polymer is diallyl dimethyl ammonium chloride/acrylamide copolymer, diallyl dimethyl ammonium chioride/diallyl amine copolymer or diallyl dimethyl ammonium chioride/allyl amine copolymer.

17. The method of claim 16 wherein the content of diallyl dimethyl ammonium chloride in the copolymer is at least 50 weight percent.

18. The method of claim 16 wherein the content of diallyl dimethyl ammonium chloride in the copolymer is at least 70 weight percent.

19. The method of claim 16 wherein the content of diallyl dimethyl ammonium chloride in the copolymer is at least 80 weight percent.

20. The method of claim 15 wherein the hydrophilic polymer is diallyl dimethyl ammonium chloride/diallyl amine copolymer or diallyl dimethyl ammonium chioride/allyl amine copolymer.

21. The method of claim 1 wherein the injected composition includes a base.

22. The method of claim 21 wherein the base is sodium hydroxide, potassium hydroxide, ammonia or calcium carbonate.

23. The method of claim 1 wherein the sugar is at least one of glucose, lactose, or 2-deoxy-D-ribose.

24. The method of claim 1 wherein the water is brine water formed during oil recovery.

25. The method of claim 1 wherein the composition forms a covalently crosslinked polymer network.

26. The method of claim 1 wherein the composition forms an ioniically crosslinked polymer network.

27. A method of recovering a fluid from a subterranean formation comprising the step of injecting into a subterranean formation a composition comprising water, at least one hydrophilic polymer containing at least two groups which are independently, the same or different, a primary amine group or a secondary amine group and at least one sugar containing a reducible functional group.

* * * * *